United States Patent
Muszumanski et al.

[11] 3,715,151
[45] Feb. 6, 1973

[54] PANCRATIC LENS

[75] Inventors: Trude Muszumanski; Irmgard Wendisch, both of Vienna, Austria

[73] Assignees: Karl Vockenhuber and Raimund Hauser, Vienna, Austria

[22] Filed: Sept. 8, 1970

[21] Appl. No.: 69,810

[30] Foreign Application Priority Data

Sept. 26, 1969 Austria..............................A 9165/69

[52] U.S. Cl..................................350/184, 350/214
[51] Int. Cl................................................G02b 15/14
[58] Field of Search..............................350/184, 186

[56] References Cited

UNITED STATES PATENTS 2,784,644 3/1957 Bednarz.............................350/184
3,348,898 10/1967 Baur et al..........................350/184

FOREIGN PATENTS OR APPLICATIONS 1,279,960 10/1968 Germany..............................350/184

*Primary Examiner*—John K. Corbin
*Attorney*—Ernest G. Montague

[57] ABSTRACT

A positive, meniscus-shaped front lens unit has a convex front surface and a concave rear surface. The concave surface has a radius of curvature which is more than twice and less than ten times the radius of curvature of said convex surface. A single biconcave lens element is axially slidably mounted between said front lens unit and a positive rear main lens unit. The radius of curvature of the front surface of said biconcave lens element is more than twice and less than three times the radius of curvature of the rear surface of the biconcave lens element. The biconcave lens element has an index of refraction $n_{d3}$ and an Abbe number $v_{d3}$ meeting the following conditions:

$$n_{d3} \leq 1.63$$

$$v_{d3} \leq 47$$

2 Claims, 5 Drawing Figures

PANCRATIC LENS

This invention relates to a fast pancratic lens, particularly a projection lens, which comprises a positive, meniscus-shaped and, if desired, achromatic, front lens unit, which has a convex front surface and concave rear surface having a radius of curvature which is more than twice and less then ten times the radius of curvature of the convex surface, a positive rear lens unit, and a biconcave lens unit, which is axially displaceable between said front and rear lens units and has a rear surface and a front surface having a radius of curvature which is more than twice and less than three times the radius of curvature of the rear surface of said biconcave lens unit. A similar lens is known, e.g., from the German Utility Model Specification 1,814,231. The performance of such lenses is restricted to a zoom ratio (ratio of maximum to minimum focal length) of about 1.7 and an f-number of f/1.6. Whereas the Austrian Patent Specification 252,611 discloses a lens of the kind defined first hereinbefore, it was necessary in said lens for the correction of chromatic aberrations to make the front lens unit and the biconcave lens unit from cemented individual lens elements. That requirement increased the expenditure and required lenses larger in diameter.

It is an object of the invention to avoid these disadvantages and to preserve the advantages as regards the zoom ratio and the relative aperture. This is accomplished according to the invention in that the biconcave lens unit and preferably also the meniscus are single lens elements and the index of refraction $n_{d3}$ and the Abbe number $v_{d3}$ of the biconcave lens meet the following conditions:

$$n_{d3} \leq 1.63$$

$$v_{d3} \geq 47$$

The invention will be now explained more fully hereinafter with reference to two embodiments shown by way of example on the drawing.

Figure 1:
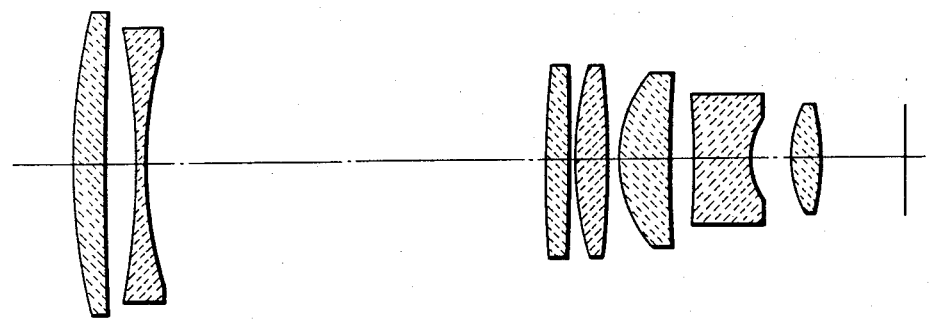
FIGS. 1 to 3 are axial sectional views showing a first projection lens in FIG. 1 as set to the smallest focal length and in FIG. 3 as set to the largest focal length.

With reference to the drawing, $r_1, r_{1a}, r_2, \ldots r_{14}$ are in millimeters the radii of curvature of successive boundary surfaces of successive lens elements, $d_1, d_{1a}, d_2, \ldots d_{13}$ are in millimeters the center distances between successive boundary surfaces, $n_{d1}, n_{d1a}, n_{d3}, \ldots n_{d13}$ are the indices of refraction of successive lens elements, and $v_{d1}, v_{d1a}, v_{d3}, \ldots v_{d13}$ are the Abbe numbers of successive lens elements.

The lens unit I is a positive meniscus lens having a convex front surface and consists preferably of a single lens element. As is apparent from the second embodiment shown in FIGS. 4 and 5, an achromatic front lens unit I may also be employed. The relation between the two boundary surfaces of the meniscus lens is defined by the condition $$|2r_1| < |r_2| < |10r_1|$$

Lens unit II is a biconcave single lens element, whose surface having a larger radius of curvature faces the lens unit I. It consists of a glass for which $$n_{d3} \leq 1.63$$

$$v_{d3} \geq 47.0$$

The two radii are within the range defined by the inequation $$|2r_4| < |r_3| < |3r_4|$$

The rear lens unit III is composed of five single lens elements. Lens unit II is succeeded by positive lens elements $L_{III_1}$, $L_{III_2}$, and $L_{III_3}$, negative lens element $L_{III_4}$, and positive lens element $L_{III_5}$. For coma correction it is desirable to use lens elements $L_{III_1}$, $L_{III_2}$ and $L_{III_3}$ having lower refractive indices than lens element $L_{III_5}$:

$$n_{d5} < n_{d13}$$

$$n_{d9} < n_{d14}$$

$n_{d7} < n_{d14}$ The center thickness $d_9$ of lens element $L_{III_3}$ should be related to the vertex distance $d_{10}$ between said lens element $L_{III_3}$ and the succeeding lens element $L_{III_4}$ by the inequation $$d_{10} < d_9 < 3d_{10}$$

whereas the center distance $d_{10}$ between $L_{III_3}$ and $L_{III_4}$ and the center distance $d_{12}$ between $L_{III_4}$ and $L_{III_5}$ are defined by the condition $$0.5\, d_{12} < d_{10} < 2d_{12}$$

Figure 2:
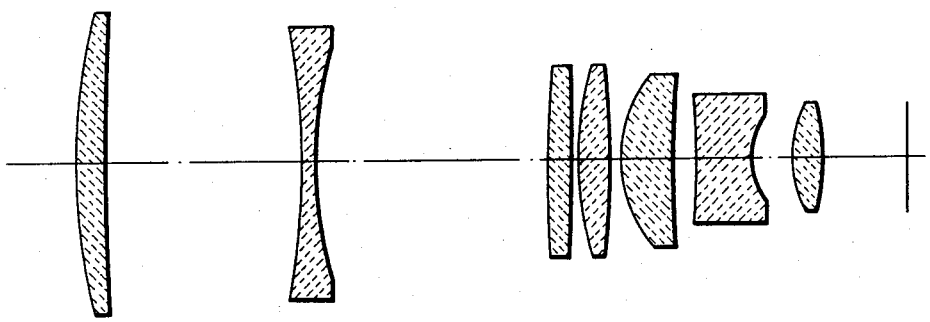
Figure 3:
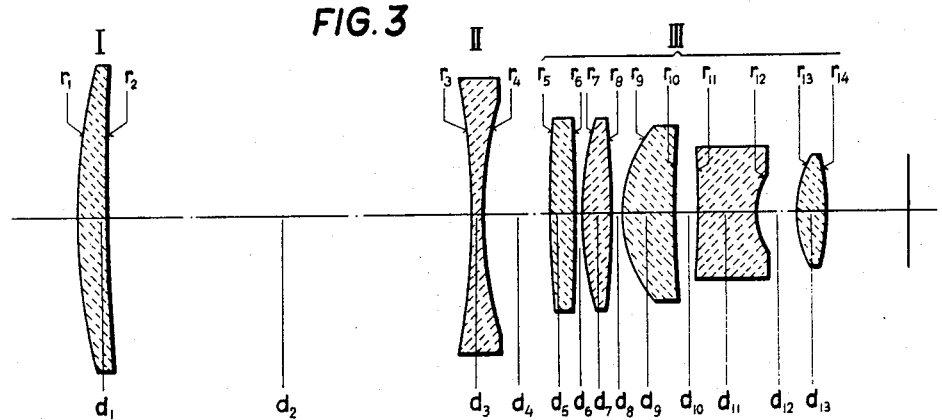

Technical data for the two embodiments shown by way of example are given hereinafter:

FIGS. 1 to 3

| | | | |
|---|---|---|---|
| $r_1 + 3.561$ | $d_1 = 0.19\,l$ | $n_{d1} = 1.504\,l$ | $v_{d1} = 66.9$ |
| $r_2 + 34.555$ | $d_2 = 0.13$ to $2.34$ | | |
| $r_3 - 6.045$ | $d_3 = 0.09\,l$ | $n_{d3} = 1.623\,l$ | $v_{d3} = 56.9$ |
| $r_4 + 2.800$ | $d_4 = 2.24$ to $0.03$ | | |
| $r_5 + 6.505$ | $d_5 = 0.16\,l$ | $n_{d5} = 1.589\,l$ | $v_{d5} = 61.3$ |
| $r_6 - 44.288$ | $d_6 = 0.01$ | | |
| $r_7 + 1.708$ | $d_7 = 0.19\,l$ | $n_{d7} = 1.589\,l$ | $v_{d7} = 61.3$ |
| $r_8 - 9.486$ | $d_8 = 0.04$ | | |
| $r_9 + 0.726$ | $d_9 = 0.31\,l$ | $n_{d9} = 1.589\,l$ | $v_{d9} = 61.3$ |
| $r_{10} + 6.661$ | $d_{10} = 0.12$ | | |
| $r_{11} - 5.038$ | $d_{11} = 0.34\,l$ | $n_{d11} = 1.805\,l$ | $v_{d11} = 25.4$ |
| $r_{12} + 0.404$ | $d_{12} = 0.22$ | | |
| $r_{13} + 0.704$ | $d_{13} = 0.18\,l$ | $n_{d13} = 1.720\,l$ | $v_{d13} = 50.4$ |
| $r_{14} - 1.311$ | | | |

Relative aperture: f/1.3
Zoom ratio: 2.02

Figure 4:
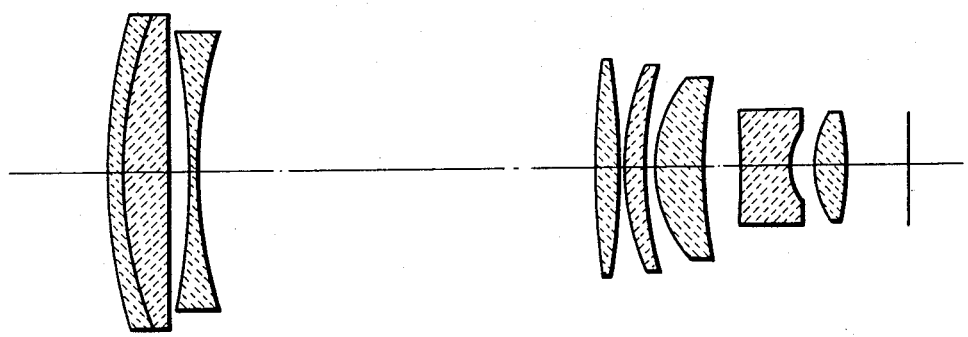
FIGS. 4 and 5 show a second projection lens also in its extreme settings.
Figure 5:
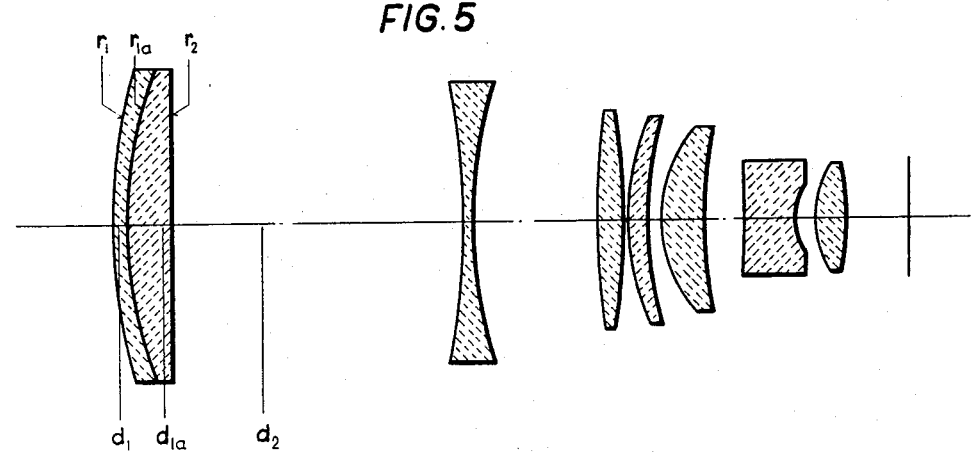

FIGS. 4 and 5

| | | |
|---|---|---|
| $r_1 + 3.408$ | $d_1 = 0.08\,l$ | $n_{d1} = 1.722$ $v_{d1} = 29.3$ |
| $r_{1a} + 2.386$ | $d_{1a} = 0.26\,l$ | $n_{d1a} = 1.557$ $v_{d1a} = 58.7$ |
| $r_2 + 32.533$ | $d_2 = 0.08$ to $2.26$ | |
| $r_3 - 5.970$ | | |

| | | | |
|---|---|---|---|
| $r_4 + 2.765$ | $d_3 = 0.09 l$ | $n_{d3} = 1.624$ | $v_{d3} = 47.0$ |
| $r_5 + 4.563$ | $d_4 = 2.21$ to $0.03$ | | |
| $r_6 - 4.563$ | $d_5 = 0.15 l$ | $n_{d5} = 1.620$ | $v_{d5} = 60.3$ |
| $r_7 + 1.345$ | $d_6 = 0.01$ | | |
| $r_8 + 2.283$ | $d_7 = 0.13 l$ | $n_{d7} = 1.641$ | $v_{d7} = 60.1$ |
| $r_9 + 0.656$ | $d_8 = 0.04$ | | |
| $r_{10} + 3.053$ | $d_9 = 0.29 l$ | $n_{d9} = 1.620$ | $v_{d9} = 60.3$ |
| $r_{11} - 7.224$ | $d_{10} = 0.19$ | | |
| $r_{12} + 0.333$ | $d_{11} = 0.30 l$ | $n_{d11} = 1.847$ | $v_{d11} = 23.8$ |
| $r_{13} + 0.508$ | $d_{12} = 0.11$ | | |
| $r_{14} - 1.553$ | $d_{13} = 0.19 l$ | $n_{d13} = 1.713$ | $v_{d13} = 53.8$ |

Relative aperture: f/1.3
Zoom ratio: 2.03

The data in the above tables are subject to the following tolerances: Radii of curvature of individual surfaces may differ to change the refractive power of the respective lens element by as much as ±10 percent. The thickness of each lens element may differ to change the focal length of the respective lens element by as much as ±0.03 millimeter. The Abbé numbers may differ up to ±5.

What is claimed is:

1. A pancratic lens, comprising
   a positive, meniscus-shaped front lens unit having a convex front surface and a concave rear surface,
   a positive rear lens unit, and
   a single biconcave lens element axially slidably mounted between said front lens unit and said rear lens unit and having front and rear surfaces,
   said rear lens unit consists of positive first, second and third lens elements, a negative fourth lens element and a positive fifth lens element, which succeed said biconcave lens element in that order,
   relative aperture: f/1.3
   Zoom ratio: 2.02

| | | | |
|---|---|---|---|
| $r_1 + 3.561$ | $d_1 = 0.19 l$ | $n_{d1} = 1.504 l$ | $v_{d1} = 66.9$ |
| $r_2 + 54.555$ | $d_2 = 0.13$ to $2.34$ | | |
| $r_3 - 6.045$ | $d_3 = 0.09 l$ | $n_{d3} = 1.623 l$ | $v_{d3} = 56.9$ |
| $r_4 + 2.800$ | $d_4 = 2.24$ to $0.03$ | | |
| $r_5 + 6.505$ | $d_5 = 0.16 l$ | $n_{d5} = 1.589 l$ | $v_{d5} = 61.3$ |
| $r_6 - 44.288$ | $d_6 = 0.01$ | | |
| $r_7 + 1.708$ | $d_7 = 0.19 l$ | $n_{d7} = 1.589 l$ | $v_{d7} = 61.3$ |
| $r_8 - 9.486$ | $d_8 = 0.04$ | | |
| $r_9 + 0.726$ | $d_9 = 0.31 l$ | $n_{d9} = 1.589 l$ | $v_{d9} = 61.3$ |
| $r_{10} + 6.661$ | $d_{10} = 0.12$ | | |
| $r_{11} - 5.038$ | $d_{11} = 0.34 l$ | $n_{d11} = 1.805 l$ | $v_{d11} = 25.4$ |
| $r_{12} = 0.404$ | $d_{12} = 0.22$ | | |
| $r_{13} = 0.704$ | $d_{13} = 0.18 l$ | $n_{d13} = 1.720 l$ | $v_{d13} = 50.4$ |
| $r_{14} - 1.311$ | | | | where $r_1, r_2, \ldots r_{14}$ are in millimeters the radii of curvature of successive boundary surface of successive lens elements, $d_1, d_2, \ldots d_{13}$ are in millimeters the center distances between successive boundary surfaces, $n_{d3}, \ldots n_{d13}$ are the indices of refraction of successive lens elements, and $v_{d1}, v_{d3}, \ldots v_{d13}$ are the Abbé numbers of successive lens elements.

2. A pancratic lens, comprising
   a positive, meniscus-shaped front lens unit having a convex front surface and a concave rear surface,
   a positive rear lens unit, and
   a single biconcave lens element axially slidably mounted between said front lens unit and said rear lens unit and having front and rear surfaces,
   said rear lens unit consists of positive first, second and third lens elements, a negative fourth lens element and a positive fifth lens element, which succeed said biconcave lens element in that order,
   Relative aperture: f/1.3
   Zoom ratio: 2.03

| | | | |
|---|---|---|---|
| $r_1 + 3.408$ | $d_1 = 0.08 l$ | $n_{d1} = 1.722$ | $v_{d1} = 29.3$ |
| $r_{1a} + 2.386$ | $d_{1a} = 0.26 l$ | $n_{d1a} = 1.557$ | $v_{d1a} = 58.7$ |
| $r_2 + 32.533$ | $d_2 = 0.08$ to $2.26$ | | |
| $r_3 - 5.970$ | $d_3 = 0.09 l$ | $n_{d3} = 1.624$ | $v_{d3} = 47.0$ |
| $r_4 + 2.765$ | $d_4 = 2.21$ to $0.03$ | | |
| $r_5 + 4.563$ | $d_5 = 0.15 l$ | $n_{d5} = 1.620$ | $v_{d5} = 60.3$ |
| $r_6 - 4.563$ | $d_6 = 0.01$ | | |
| $r_7 + 1.345$ | $d_7 = 1.03 l$ | $n_{d7} = 1.641$ | $v_{d7} = 60.1$ |
| $r_8 + 2.283$ | $d_8 = 0.04$ | | |
| $r_9 + 0.656$ | $d_9 = 0.29 l$ | $n_{d9} = 1.620$ | $v_{d9} = 60.3$ |
| $r_{10} + 3.053$ | $d_{10} = 0.19$ | | |
| $r_{11} - 7.224$ | $d_{11} = 0.30 l$ | $n_{d11} = 1.847$ | $v_{d11} = 23.8$ |
| $r_{12} + 0.333$ | $d_{12} = 1.11$ | | |
| $r_{13} + 0.508$ | $d_{13} = 0.19 l$ | $n_{d13} = 1.713$ | $v_{d13} = 53.8$ |
| $r_{14} - 1.553$ | | | | where $r_1, r_{1a}, r_2, \ldots r_{14}$ are in millimeters the radii of curvature of successive boundary surfaces of successive lens elements, $d_1, d_{1a}, d_2, \ldots d_{13}$ are in millimeters the center distances between successive boundary surfaces, $n_{d1}, n_{d1a}, n_{d3}, \ldots n_{d13}$ are the indices of refraction of successive lens elements, and $v_{d1}, v_{d1a}, v_{d3}, \ldots v_{d13}$ are the Abbe numbers of successive lens elements.

* * * * *